United States Patent [19]

Nakai

[11] Patent Number: 4,978,291

[45] Date of Patent: Dec. 18, 1990

[54] METHOD OF REGULATING THE FUEL-AIR MIXTURE IN A BURNER

[76] Inventor: Gary T. Nakai, 11616 Woodcreek Dr., South, Apt. F, Huntley, Ill. 60142

[21] Appl. No.: 417,825

[22] Filed: Oct. 6, 1989

Related U.S. Application Data

[60] Division of Ser. No. 89,237, Aug. 24, 1987, Pat. No. 4,934,924, which is a continuation-in-part of Ser. No. 797,392, Nov. 12, 1985, Pat. No. 4,706,644.

[51] Int. Cl.[5] .............................................. F23N 1/02
[52] U.S. Cl. ..................................... 431/12; 237/2 A
[58] Field of Search ....................... 431/80, 81, 79, 12; 237/2 A, 12.3 C

[56] References Cited

U.S. PATENT DOCUMENTS 4,645,450 2/1987 West ....................................... 431/12

Primary Examiner—Henry A. Bennet
Attorney, Agent, or Firm—Juettner Pyle and Lloyd

[57] ABSTRACT

A method for regulating the fuel-air mixture in a fuel burner to maximize combustion and minimizing smoking is disclosed. The method comprising the steps of monitoring temperature variations in the heat produced by the burner; incrementally increasing fuel delivery when a temperature decrease is indicated; detecting air delivery to the burner; incrementally increasing air delivery to the burner when a temperature increase is indicated and air delivery is not at a maximum; and decreasing by less than a full increment fuel delivery to the burner when a temperature increase is indicated and air delivery is at maximum.

1 Claim, 5 Drawing Sheets

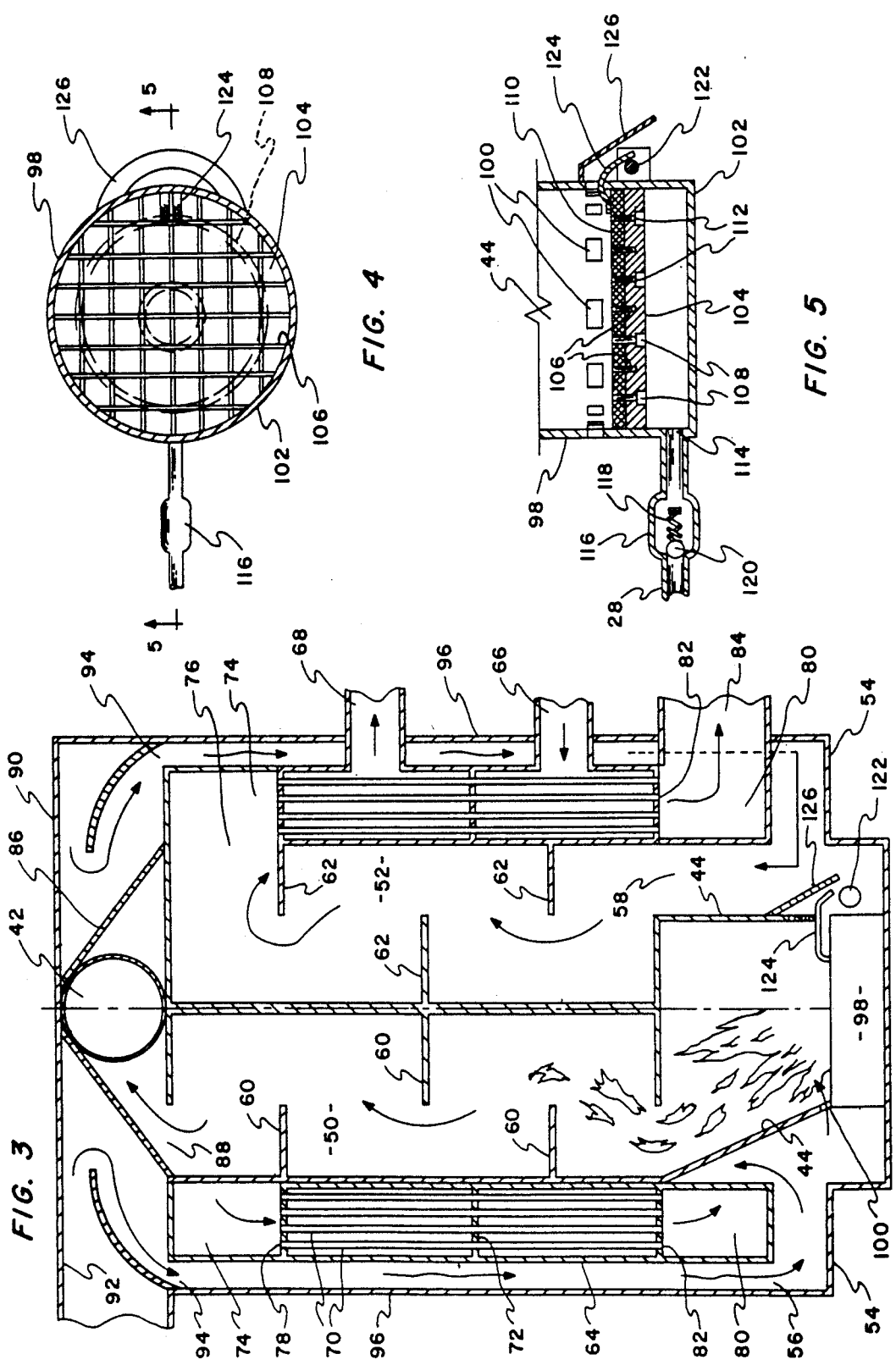

METHOD OF REGULATING THE FUEL-AIR MIXTURE IN A BURNER

CROSS-REFERENCE

This application is a division of copending application Ser. No. 089,237, now U.S. Pat. No. 4,934,924 filed Aug. 24, 1987 which is a continuation-in-part of application Ser. No. 797,392 filed Nov. 12, 1985, now U.S. Pat. No. 4,706,644, issued Nov. 17, 1987.

BACKGROUND OF THE INVENTION

The invention relates to heaters for engines, and more particularly, preheaters for watercooled diesel engines. The invention also relates to multi-stage heat exchangers and fuel burners.

It is well known that engines, particularly diesel automobile and truck engines, and off highway equipment, are difficult to start in cold weather. Cold weather adversely affects fuel ignition, increases the viscosity of engine lubricants making it more difficult to crank the engine, and reduces the electrical power outputs of storage batteries for cranking the engine. Many attempts have been made to solve these problems. For example, the following U.S. Patents disclose various devices for heating engines:

| U.S. Pat. No. | Date     | Inventor   |
|---------------|----------|------------|
| 3,796,207     | 03-12-74 | Olson      |
| 3,758,031     | 09-11-73 | Moran      |
| 2,737,169     | 03-06-56 | Kimberlin  |
| 2,695,603     | 11-30-54 | Williams   |
| 2,681,052     | 06-15-54 | Kazial     |
| 2,627,258     | 02-03-53 | Mariska    |

The devices disclosed by the above listed patents and other prior engine heaters are generally adapted for heating truck engines overnight. But, such devices are generally not suitable for rapidly preheating engines.

There are several primary drawbacks in the prior art. First, the prior art teaches low efficiency single stage heat exchangers, i.e., the surface area of the heat exchanger is relatively low as compared to the volume of coolant to be heated. This is due to the tendency of soot to build up on the relatively cool heat exchanger walls, necessitating large unobstructed passages through the heat exchanger. Because of their low efficiency, these heaters are suitable for overnight heating, but not for rapid preheating.

A second drawback is the size of the heaters. Because of their low efficiency, relatively large heaters are required. This is a problem for automobile applications where there is limited space available under the hood.

Another drawback is that the prior art devices heat the engine block, but not the engine battery compartment. It would be desirable to also heat the battery to increase the power available for cold cranking.

The burners employed in the prior art heaters are of several types, each with attendant disadvantages. One variety of burner is a gaseous fuel burner. The disadvantage here is that an additional fuel tank is required, apart from the vehicle fuel tank, for the gaseous fuel. A second variety of burner is a wick type liquid fuel burner. This is preferable to gaseous fuel burners because an additional fuel tank is not required. However, these burners are typically gravity fed, which means that they must be positioned below the fuel tank; they tend to leak fuel; and their combustion efficiency cannot be controlled. The third variety of burner is a fuel spray nozzle with high voltage spark ignition. The attendant disadvantage of these burners is that the spray nozzles occasionally clog, require high fuel delivery pressures, and high voltage ignition is a drain on the power supply.

It would be desirable to have an efficient engine preheater, that will rapidly warm the engine and also warm the vehicle battery compartment, that is sufficiently small in size for use in automobiles, and that employs a controllable liquid fuel burner that does not require high voltage ignition.

OBJECTS OF THE INVENTION

It is an object of the invention to provide a highly efficient heater that will rapidly preheat an engine.

It is another object of the invention to provide a compact heater suitable for automobile applications.

It is a further object of the invention to provide means for warming the battery compartment, engine compartment and operator's compartment of the vehicle with clean hot air.

It is a still further object of the invention to provide a highly efficient liquid fuel burner for the heater that does not require a separate fuel tank, that does not leak, that has means for controlling combustion to maximize heat production, and that does not require high voltage ignition.

SUMMARY OF THE INVENTION

The foregoing objects are accomplished by providing an apparatus for preheating a watercooled engine, comprising a heater having a combustion chamber, a liquid fuel burner in the combustion chamber, a two stage heat exchanger, a blower, a coolant pump and a fuel pump. The first stage of the heat exchanger transfers heat from combustion gases to clean air supplied by the blower. Specifically, the gas-to-air heat exchanger comprises a plurality of gas conduits from the combustion chamber defining air passages therebetween. The gas conduits are heated red hot by the burner which oxidizes carbonized volatiles that would accumulate as soot. With the soot accumulation problem solved, the surface area to volume ratio of heat exchange area may be increased while decreasing the overall size of the exchanger, thus greatly increasing efficiency.

The second stage heat exchanger transfers heat from the now hot air from the first stage to the engine coolant. The air-to-coolant heat exchanger comprises an annular coolant jacket having a coolant inlet and outlet, and a multiplicity of small diameter air conduits through the coolant jacket. Small diameter air conduits are used as clogging is not a problem with clean air (as opposed to exhaust gases) and a multiplicity of small conduits provides a very high ratio of heat transfer surface area to coolant volume, thereby maximizing the rate of heat transfer and efficiency. Furthermore, the still warm hot air expelled from the air-to-coolant heat exchanger may be transmitted to the vehicle battery compartment to heat the battery, to the engine and to the operator's compartment if desired.

The burner comprises a cup-shaped housing having fuel inlet, a plate enclosing the open top of the housing, the plate having a first pattern of grooves in its outer surface and a second pattern of grooves, intersecting the first pattern, in its inner surface, a wick held in the first pattern of grooves, a pressure actuated inlet valve and a glow plug igniter. The fuel pump and the inlet valve operate to maintain fuel pressure in the housing slightly above atmospheric pressure forcing the fuel through openings in the plate formed by the intersecting patterns of grooves and into the wick. The amount of fuel delivered to the wick may thus be controlled by regulating the output of the fuel pump. The inlet valve also operates to close off fuel to the burner when the same is not in operation, thus avoiding leakage. A glow plug may be used for igniting the burner—high voltage spark ignition is not necessary.

Alternatively, the burner plate and wick may be integrally molded from a porous metal or ceramic material. In this embodiment fuel passages through the plate are provided without need to form intersecting patterns of grooves.

The combustion chamber is provided with openings around the peripheral edges of the burner receptive of forced air from the blower, to supply air for combustion. The volume of air delivered to the combustion chamber may be controlled by regulating the output of the blower. Thus, by regulating the fuel pump and blower one can control combustion to produce maximum heat from the burner.

Because the problem of soot accumulation is avoided, large diameter passages eliminated and heat transfer surface area to coolant volume ratio increased, the heater of the invention may be made in a very compact size suitable for automobiles. Because the burner combustion may be controlled to maximize heat production and because of the increased efficiency of the two stage heat exchanger, engine coolant may be heated rapidly to raise the engine block to the desired temperature in a matter of minutes, thereby avoiding the necessity of overnight heating.

Further objects and advantages of the heater of the invention will become apparent from the following detailed description viewed in conjunction with the accompanying drawings.

BRIEF DESCRIPTION OF THE DRAWINGS

FIG. 3 is a vertical cross-sectional view of the heater, taken along line 3—3 of FIG. 2.

FIG. 4 is a plan view of the burner.

FIG. 5 is a vertical cross-sectional view of the burner taken along line 5—5 of FIG. 4.

DETAILED DESCRIPTION

Figure 1:
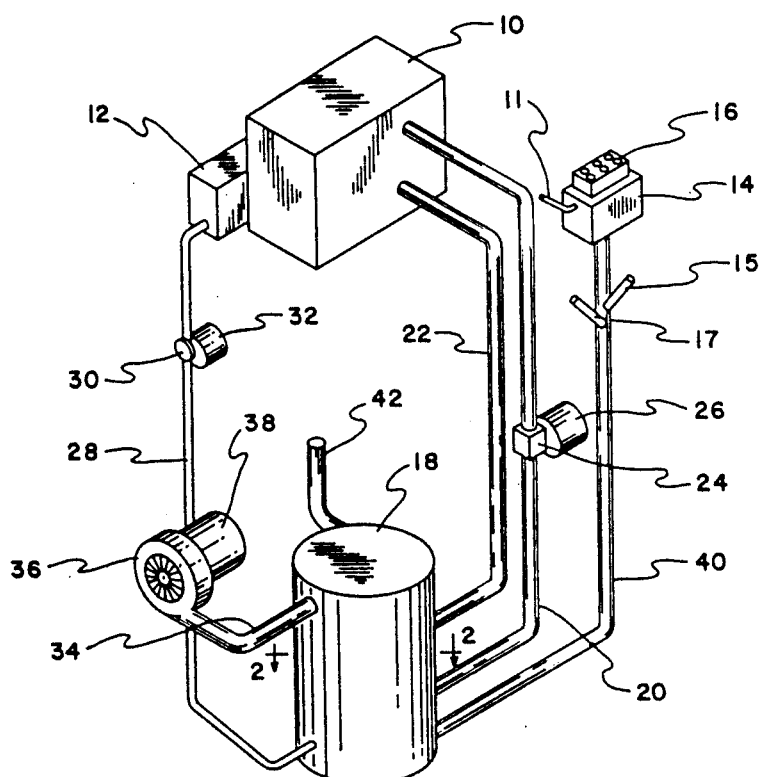
FIG. 1 is a schematic perspective view of the apparatus of the invention.

Referring to FIG. 1, a watercooled engine 10, vehicle fuel tank 12, vehicle battery compartment 14 and storage battery 16 are schematically depicted. Coolant from the engine 10 is circulated through the heater 18 through a coolant inlet line 20 and coolant return line 22. The coolant is circulated with a coolant pump 24 having a motor 26. Fuel is supplied to the heater 18 from the tank 12 through the fuel line 28 by fuel pump 30 having a motor 32. Clean air is supplied to the heater 18 through an air line 34 from a blower 36. The blower 36 is driven by a motor 38. Warm air is discharged from the heater 18 through an air discharge line 40. The warm air discharge line 40 is connected to the battery compartment 14 for preheating the battery 16, and then to the engine compartment 11. Additionally, warm clean air from line 40 may be supplied to the operator's compartment 15, or to further improve cold starting, to the engine air intake 17. Combustion gases are expelled from the heater 18 through an exhaust pipe 42.

The coolant lines 20 and 22 are preferably conventional vulcanized rubber coolant hose. The coolant pump 24 and motor 26 preferably are a conventional coolant pump and a 12 volt direct current motor.

The fuel line 28 is preferably copper tubing. The fuel pump 30 and motor 32, likewise are preferably a conventional automobile fuel pump whose fuel delivery rate can be varied by varying the applied voltage to the 12 volt direct current motor.

The air lines 34 and 40 are preferably conventional flexible, heat resistant pipe having a steel spring reinforcing member. The blower 36 and motor 38 are preferably a squirrel cage, "heater" type blower having a 12 volt direct current motor.

The exhaust pipe 42 is preferably flexible steel pipe.

Figure 2:
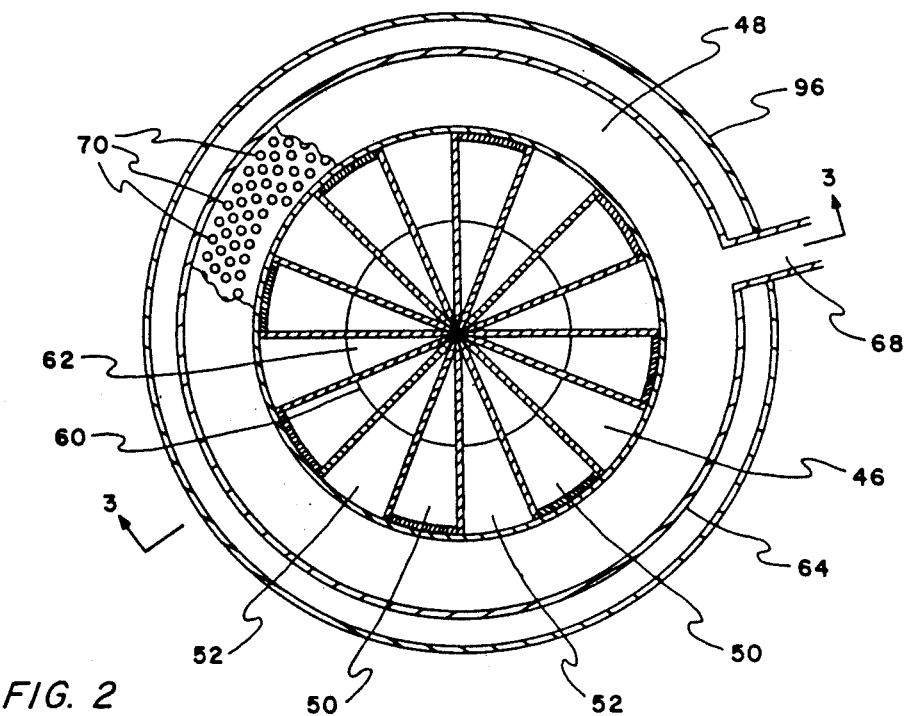
FIG. 2 is a horizontal cross-sectional view of the heater, taken along line 2—2 of FIG. 1, illustrating the two stage heat exchanger.

Referring now to FIGS. 2 and 3, the heater 18 comprises a combustion chamber 44 a gas-to-air stage heat exchanger 46, and an air-to-coolant stage heat exchanger 48. The heat exchanger 46 comprises a plurality of spaced gas conduits 50 from the combustion chamber 44, defining air passages 52 therebetween. The first stage heat exchanger 46 also preferably includes baffles 60 in the gas conduits 50, and baffles 62 in the air passages 52 to increase the path length of the gas and air, respectively, to increase efficiency of heat exchange from the combustion gas to the clean air.

In the preferred embodiment illustrated in FIGS. 2 and 3, the gas-to-air stage heat exchanger 46 comprises a cylindrical member having a plurality of pie-shaped gas conduits 50 defining a like number of air passages 52 therebetween. It is to be understood, however, that other configurations may be used. For example, an alternative design for the gas-to-air heat exchanger could comprise one or more cylindrical combustion gas pipes from the combustion chamber surrounded by a larger diameter cylindrical member, air passage(s) being defined by the spaces between the pipes and/or between the pipes and the cylindrical member.

The air-to-coolant stage heat exchanger 48 comprises a coolant jacket 64 having a coolant inlet 66 and coolant outlet 68, and a multiplicity of air conduits 70 therethrough. The second stage heat exchanger may include one or more baffles 72 to increase the path length of the coolant through the heat exchanger 48.

In the preferred embodiment illustrated in FIGS. 2 and 3, the air-to-coolant stage heat exchanger 48 comprises an annular member surrounding the gas-to-air stage heat exchanger 46. This design is preferred for several reasons. First, heat from gas conduits 50 and air passages 52 radiate through the coolant jacket 64 contributing to heating the coolant. Thereby, the efficiency of the ultimate heat exchange from the combustion gas to coolant is increased. Second, the concentric design is compact saving valuable space. Third, the air-to-coolant stage exchanger 48 acts to insulate the extremely hot gas-to-air stage exchanger 46 from the environment in which the heater is installed, i.e., the vehicle engine compartment.

A first air manifold 54 directs air into the heat exchanger 46. The air manifold 54 has a clean air inlet 56 and outlet 58. The air manifold 54 receives clean air though its inlet 56 and directs the same against the combustion chamber 44 and then through its outlets 58 into the air passages 52.

A second air manifold 74 is provided to direct the hot air from the gas-to-air stage exchanger 46 into the air-to-coolant stage exchanger 48. The manifold 74 has inlets 76 connected to each of the air passages 52 and outlets 78 into one end of the air conduits 70.

A discharge air manifold 80 has inlets 82 for receiving warm air from the air conduits 70, and an outlet pipe 84. The outlet pipe 84 is connected to the air discharge line 40, which is connected to the battery compartment 14, engine compartment 11, operator's compartment 15 and engine intake 17, as previously described.

The preferred embodiment of the heater 18 further includes an exhaust manifold 86 having inlets 88 for receiving combustion gas from gas conduits 50, an air intake manifold 90 having an inlet pipe 92 and an annular outlet 94, and an air jacket 96. The inlet air manifold serves to shield and insulate the exhaust manifold 86 from the environment in which the heater 18 is installed, and to partially heat the incoming air. The air jacket 96 serves to insulate the second air manifold 74, discharge air manifold 80 and air-to-coolant stage heat exchanger 48 from the environment, and to convey the air from the intake manifold 90 to the first air manifold 54.

The gas-to-air stage heat exchanger 46 and exhaust manifold 86 are preferably fabricated from stainless steel sheet to withstand the extreme heat of the burning gases. The air jacket 96 and various air manifolds 90, 54, 74 and 80 may be fabricated from mild steel. The air conduits 70 are preferably small diameter copper or brass tubing, as such metals have superior heat transfer properties. The coolant jacket 64 and coolant inlet and outlet pipes 66 and 68 are preferably fabricated from brass tubing and silver soldered together or otherwise cold formed integral to each other.

The burner 98 is secured in the combustion chamber 44 as illustrated in FIG. 3. As shown in FIGS. 3 and 5, the combustion chamber 44 is provided with openings 100 to permit air to be forced from the first air manifold 54 into the combustion chamber 44.

The burner 98 comprises an open top housing 102 and a plate 104 welded or press fitted into the top of the housing 102. The plate 104 has a first pattern of grooves 106 in its outer surface and a second pattern of grooves 108 in its inner surface. The grooves 106 and 108 are cut sufficiently deep that they intersect each other, while maintaining the structural integrity of the plate 104. In the preferred embodiment illustrated in FIGS. 4 and 5 the first pattern of grooves 106 is a rectangular grid and the second pattern 108 is concentric circles. Other patterns could be used, as long as the two patterns are not the same, and the two patterns intersect one another. The square pattern is preferred for the first pattern to hasten flame transfer across the entire wick network. Wick material 110 is fitted into the first pattern of grooves 106. The intersection of the two patterns of grooves 106 and 108 forms openings 112 that permit fuel to pass from the housing 102 into the wick 110 where it evenly distributes throughout the wick 110, assisted by capillary action.

The housing 102 has an inlet 114. The inlet 114 is preferably fitted with a valve 116. The valve 116 includes a closure member 120 and a spring 118. The spring 118 biases the closure member 120 in an upstream direction to close fuel flow to the housing 102.

In operation, the fuel pump 30 produces sufficient pressure upstream to the valve 116 to overcome the force of the spring 118 and thereby shuttle the closure member 120 to permit fuel to enter the housing 102. When the housing 102 is filled, the fuel within the housing is pressurized slightly above atmospheric pressure, forcing the fuel through the openings 112 and into the wick 110. Capillary action of the wick 110 also assists in drawing fuel from the housing 102.

To ignite the burner 98, a glow plug 122 is secured to either the exterior of the burner 98 or to the manifold 54. It is preferable to secure the glow plug 122 to manifold 54 adjacent to, but not in contact with, the burner 98 or combustion chamber 44 to keep the plug as cool as possible. The glow plug is also cooled by the incoming air at 54. A starter wick 124 is secured to the burner 98 with one end adjacent the glow plug 122 and the other end in contact with the wick 110, to transmit a flame started by the glow plug 122 to the wick 110. Other means for igniting the burner 98 may be employed, if desired. A hood 126 is secured to the burner 98 surrounding the glow plug 122 to shelter the same from draft which would inhibit ignition, and also to direct starting fumes up through the combustion chamber 44 rather than backing up through the inlet 58.

The housing 102, plate 104 and hood 126 are preferably fabricated from stainless steel to withstand heat, but can be of mild steel due to the cooling affect of the incoming air. The wick 100 and starting wick 124 are preferably stainless steel mesh to withstand heat. The inlet 114 and valve 116 may be fabricated from steel tubing. The closure member 120 is preferably a brass or stainless steel ball. And, the spring 118 is preferably stainless steel.

Figure 8:
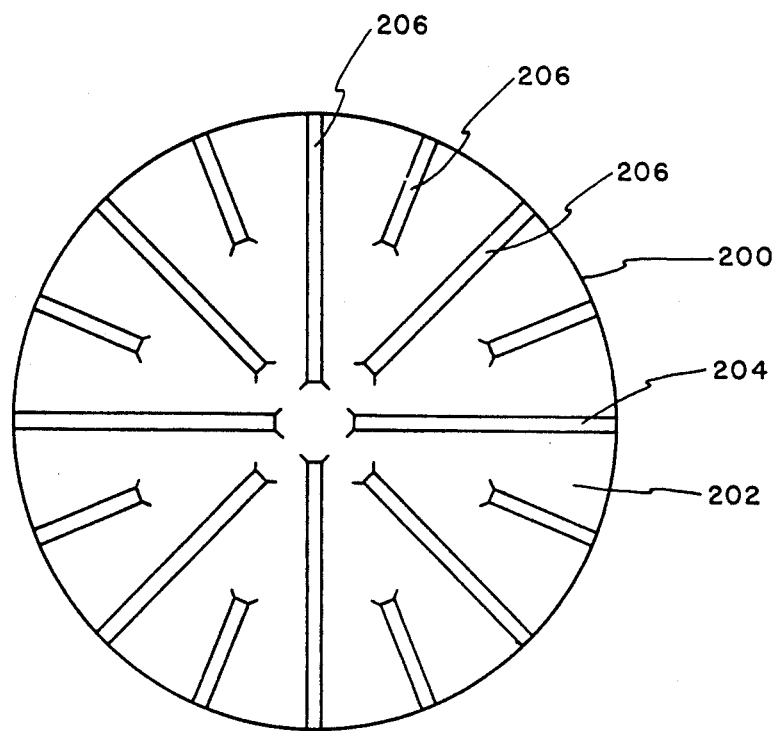
FIG. 8 is a plan view of a preferred alternative burner plate for the burner of FIGS. 4 and 5.
Figure 9:
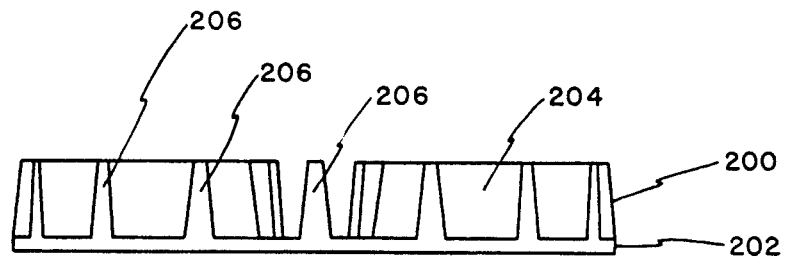
FIG. 9 is a side view of the preferred alternative burner plate of FIG. 8.

FIGS. 8 and 9 illustrate an alternative preferred burner plate 200 for the burner 98. The plate 200 may be substituted for the plate 104 and wick material 110 illustrated in FIGS. 4 and 5. The plate 200 is preferably molded from a porous heat resistant material, such as ceramic, sintered metal or combination ceramic and sintered metal materials. Favorable results have been obtained with a sintered bronze material, however, other metals such as stainless steel may be used. The plate 200 has a base portion 202 and rib or wick portion 204 integral therewith. The rib or wick portion 204 comprises a plurality of radially extending ribs 206 for supporting and carrying a flame. Although a radial rib pattern is disclosed, other patterns, such as a square or "waffle" pattern, could be used.

While two embodiments of burner plates and wick means have been shown and described, it is to be understood that other embodiments may be constructed within the scope of this invention. The function of the burner plate is to enclose the housing 102 and provide fuel passages from the interior of the housing to the wick means. The wick means may be separate members secured to the plate as shown in FIGS. 4 and 5, or may be integral with the plate as shown in FIGS. 8 and 9. The wick means may be of any pattern to hold and carry a flame.

Figure 6:
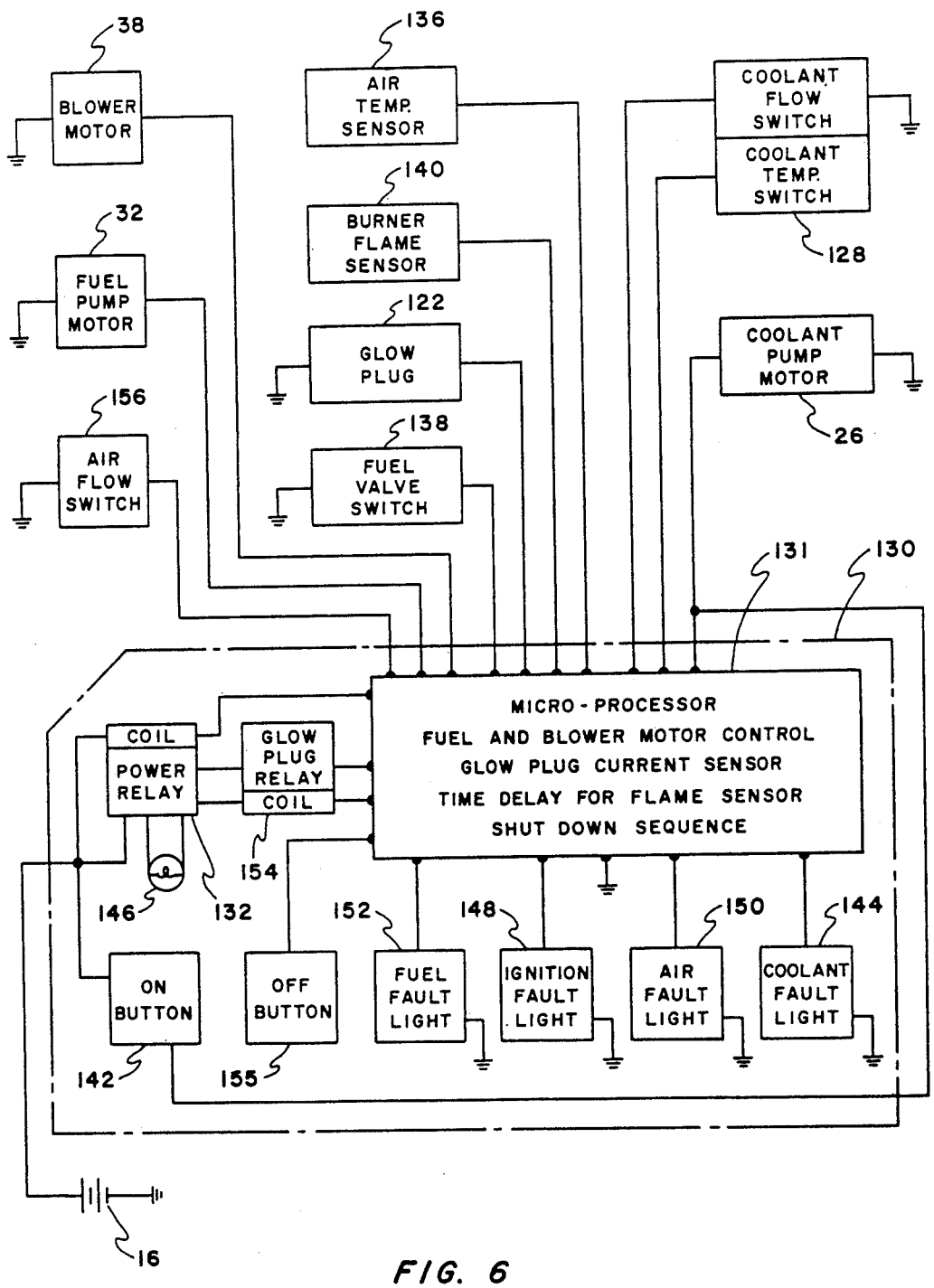
FIG. 6 is a schematic wiring diagram of the apparatus of the invention.
Figure 7:
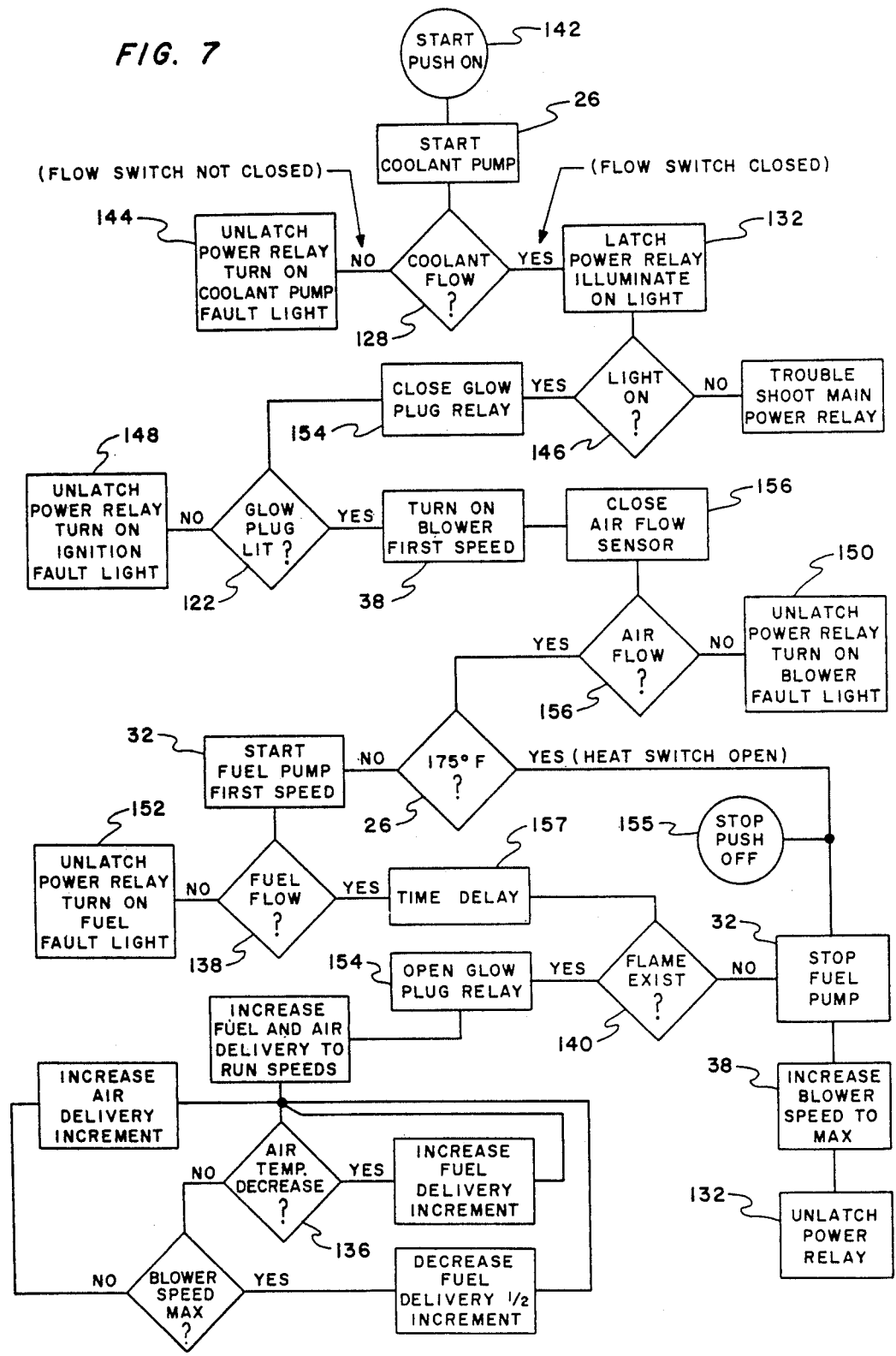
FIG. 7 is a schematic logic diagram for the operation and control of the apparatus of the invention.

Referring now to FIGS. 6 and 7, a coolant temperature sensor 128 is secured in the inlet coolant line 20 to sense coolant temperature. The sensor 128 is preferably a simple heat switch set to open when the coolant temperature reaches a predetermined value, e.g., 175° F. The sensor 128 is electrically connected through the micro processor 131 within the control module 130 to the coil of the power relay 132. Thus, when the predetermined coolant temperature is reached, the sensor 128 opens and initiates the shut down sequence, namely: Cutting power to the fuel pump 32, which decreases the pressure in the fuel line 28 causing the valve 116 to close fuel flow to the burner 98; Increasing the blower speed to maximum to consume remaining fuel in the burner, and thereby extinguish the same; followed by unlatching the power relay 132.

Means for maximizing combustion efficiency to produce maximum heat and minimize fuel consumption is provided. An air temperature sensor 136 is secured in the second air manifold 76. Alternatively, the sensor 136 may be secured in a gas conduit 50, air passage 52 or exhaust manifold 86, or any other location where the temperature is primarily dependent on the heat produced by combustion. It is preferable to secure the sensor 136 in the air manifold 76 as the air here is somewhat cooler and cleaner than in the combustion gas flow, thus increasing the life and effectiveness of the sensor. The sensor 136 is electrically connected to the micro processor 131 within the control module 130, as is the fuel pump motor 32 and blower motor 38.

The control module 130 includes a microprocessor 131 for monitoring variations in the electrical resistance of sensor 136. The microprocessor 131 also monitors and controls the voltage across the fuel pump motor 32 and blower motor 38. The micro processor 131 is programmed to: incrementally increase the voltage to the fuel pump motor 32 when the sensor 136 indicates a decrease in temperature over a period of time, thus increasing the rate of fuel delivery to the burner 98; incrementally increase the voltage to the blower motor 38 when the sensor 136 indicates an increase in temperature over a period of time, thus increasing the rate of delivery of forced air to the burner 98; and decreasing by one-half an increment the voltage to the fuel pump motor 32 when the sensor 136 indicates an increase in temperature over a period of time and maximum voltage to the blower motor 38 has been achieved, thus decreasing fuel delivery to the burner 98 to avoid burning an overly rich mixture which results in smoking, and to avoid fuel flooding out of the housing 98. The foregoing monitoring and fuel and air adjusting functions continue throughout the heating cycle maximizing combustion efficiency.

The apparatus of the invention also includes various other monitoring features. The valve 116 is wired to form a fuel flow indicator switch 138. Specifically, one electrical lead may be connected to the closure member 120 and another to a contact (not shown) on the valve housing 116 such that a circuit is completed when the member 120 is in a closed position and the circuit is broken when the member 120 is in an open position. Thereby, fuel delivery may be monitored. A burner flame sensor 140 is included. The sensor 140 is preferably a photo electric cell. The sensor 140 is wired to the microprocessor 131 within control module 130 to disengage power to the glow plug 122 via the glow plug relay 154 when ignition has been achieved and a healthy flame exists across the wick matrix 110.

The apparatus of the invention and the complete logic of the control module is set forth in the FIG. 7 schematic flow diagram. The sequence of engaging components serves a self diagnostic function for the operator. When the operator desires to preheat his engine and battery, he presses the main power switch on button 142 (momentary contact) which starts the coolant pump 24 circulating coolant from the engine 10 through line 20 into the air-to-coolant stage heat exchanger 48 and back to the engine 10 through line 22. The microprocessor 131 senses coolant flow via sensor 128 (flow switch portion). If no flow is perceived, a pump fault indicator light 144 is lit and the power relay 132 is prevented from latching. If no flow is indicated during operation, power relay 132 is unlatched. If the flow switch closes, the power relay 132 is latched lighting the "ON" indicator light 146, and delivering power to the coil portion of the glow plug relay 154, latching the same, thereby delivering power to the glow plug 122. If a voltage drop is not indicated across the glow plug 122, an ignition fault indicator light 148 is lit and the power relay 132 is unlatched. If there is a voltage drop across the glow plug 122, a minimum voltage is delivered to the blower motor 38 through the microprocessor 131 causing the blower to force air through line 34 into the intake manifold 90, through the air jacket 96 and into the first air manifold 54. A portion of the air then travels through opening 100 and up through the hood 126 to insure a draft within the combustion chamber 44. The remaining air travels through the air passages 52 of the gas-to-air heat exchanger 46, the second air manifold 74, the air conduits 70 of the air-to-coolant heat exchanger 48, the air discharge manifold 80, the air discharge line 40 and into the battery compartment 14, and/or the engine compartment 11, operator's compartment 15 and engine intake 17. The blower output is monitored by the microprocessor 131, via an air flow switch 156 located in line 34. If the air flow switch 156 does not close, indicating no air flow, a blower fault lamp 150 is lit, and the power relay 132 is unlatched. If the air flow switch 156 closes, indicating that air is being delivered, coolant temperature is checked by microprocessor 131 via sensor 128. If the predetermined temperature has not been achieved, power is delivered to the fuel pump motor 32 through microprocessor 131 to drive the fuel pump 30. Fuel is drawn from the fuel tank 12 through line 28 to the valve 116. When the fuel pressure in line 28 exceeds the force of the spring 118, the closure member 120 is forced open permitting fuel to travel into the burner housing 102 where it passes through the openings 112 in the plate 104 and into the wick 110. If the fuel flow switch 138 remains open, a fuel fault indicator light 152 is lit. If the fuel flow switch 138 closes and the flame sensor 140 indicates no flame, power is continued to the glow plug 122 due to the time delay 157. The time delay 157 allows for slow ignition with thick fuels without flooding. When the burner ignites, the flame sensor 140 detects the flame, and the glow plug relay 154 is unlatched disengaging power to the glow plug 122. The microprocessor 131 then steps up the voltage across the fuel pump motor 32 and blower motor 38, increasing fuel and air delivery and holds them at a predetermined level. The microprocessor senses and stores in memory the temperature indicated by the air temperature sensor 136. If a decrease is sensed, fuel delivery is increased again by an increment. If no decrease is sensed, the microprocessor then incrementally increases and holds voltage across the blower motor 38 increasing the flow of forced air to the combustion chamber 44. The microprocessor 131 again checks for a temperature decrease from sensor 136. If the temperature decreases, fuel supply is incrementally increased and held, enriching the fuel/air mixture. Temperature at sensor 136 will then go up, the microprocessor again increases blower speed and senses for a temperature drop at 136. The cycle continues until maximum voltage is across the blower motor 38. Once maximum blower speed has been achieved and air temperature increases, as indicated by the sensor 136, fuel delivery is decreased by less than a full increment to lean the mixture. The process of adjusting the fuel delivery rate balanced on the lean side by the blower motor status continues throughout operation to maximize combustion efficiency and heat production with minimum smoking.

In the meantime flames from combustion roar in the combustion chamber 44 and into the gas conduits 50 heating the same red hot. The air passing across the hot exhaust manifold 86 in the air intake manifold 90 is partially heated. The air is further heated by passing across the combustion chamber 44 in the first air manifold 54, and is finally heated by passing through the air passages 52 between the gas conduits 50. The now extremely hot air is directed by the second air manifold 74 into the air conduits 70 of the air-to-coolant stage heat exchanger 48 where the heat is transferred through the walls of the conduits 70 into the coolant. The still warm air is discharged from the air conduits 70 into the discharge manifold 80.

Coolant is circulated through the coolant jacket 64 and returned to the the engine block 10. The coolant is circulated until the engine block is sufficiently heated to start the engine. However, the coolant in the inlet line 20 cannot exceed the predetermined temperature. When such occurs, the coolant temperature sensor 128 is activated initiating the shut down sequence of the system. The engine block and battery are thereby rapidly heated to the desired temperature for easy starting.

The heater will run until it is either turned off by manual activation of the off button 155, by sensor 136 reaching 175° F., or by a component failure opening the power relay.

It is to be understood that the preferred embodiment of the invention and representative mode of use thereof has been illustrated and described herein, and that various changes thereto could be made without departing from the scope of the invention.

I claim:

1. A method for regulating the fuel-air mixture of a fuel burner, said burner having a temperature sensor for sensing the temperature of the heat produced by the burner, a fuel pump for delivering fuel to the burner, means for controlling fuel delivery by a predetermined increment or a fraction thereof, a blower for delivering air to the burner, means for incrementally controlling air delivery and means for detecting air delivery to the burner up to a predetermined maximum, comprising the steps of:
    (a) monitoring the temperature of the heat produced by the burner to detect whether a change in temperature has occurred over a predetermined interval of time;
    (b) increasing fuel delivery by an increment when a decrease in said change in temperature has been detected;
    (c) detecting air delivery to the burner when an increase in said change in temperature has been detected;
    (d) increasing air delivery by an increment, when an increase in said change of temperature has been detected and air delivery is not at maximum; and
    (e) decreasing fuel delivery by a fraction of an increment when an increase in said change of temperature has been detected and air delivery is at maximum.

* * * * *